United States Patent
Nefcy et al.

(10) Patent No.: US 9,771,063 B2
(45) Date of Patent: Sep. 26, 2017

(54) METHODS AND SYSTEM FOR MITIGATING UNDESIRABLE CONDITIONS DURING REGENERATIVE BRAKING

(71) Applicant: Ford Global Technologies, LLC, Dearborn, MI (US)

(72) Inventors: Bernard D. Nefcy, Novi, MI (US); Mark Steven Yamazaki, Canton, MI (US); Jason Meyer, Canton, MI (US); Mark Davison, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/942,653

(22) Filed: Nov. 16, 2015

(65) Prior Publication Data

US 2017/0137021 A1    May 18, 2017

(51) Int. Cl.

| | |
|---|---|
| *B60W 20/00* | (2016.01) |
| *F16H 61/02* | (2006.01) |
| *B60W 20/30* | (2016.01) |
| *B60W 20/14* | (2016.01) |
| *B60K 6/26* | (2007.10) |
| *B60K 6/40* | (2007.10) |
| *B60W 10/08* | (2006.01) |
| *B60W 10/11* | (2012.01) |
| *F16H 59/70* | (2006.01) |

(52) U.S. Cl.
CPC .............. *B60W 20/30* (2013.01); *B60K 6/26* (2013.01); *B60K 6/40* (2013.01); *B60W 10/08* (2013.01); *B60W 10/11* (2013.01); *B60W 20/14* (2016.01); *F16H 59/70* (2013.01); *F16H 61/0204* (2013.01); *B60W 2510/104* (2013.01); *B60W 2510/1005* (2013.01); *B60W 2510/1015* (2013.01); *B60W 2710/083* (2013.01); *B60W 2710/1005* (2013.01); *B60Y 2200/92* (2013.01); *B60Y 2300/18125* (2013.01); *F16H 2059/706* (2013.01); *Y10S 903/906* (2013.01); *Y10S 903/93* (2013.01); *Y10S 903/951* (2013.01)

(58) Field of Classification Search
CPC .............................. B60W 20/30; B60W 20/11
USPC .......................................................... 701/51
See application file for complete search history.

(56) References Cited

U.S. PATENT DOCUMENTS

| | | |
|---|---|---|
| 2013/0296100 A1 | 11/2013 | Nefcy et al. |
| 2015/0360691 A1 | 12/2015 | Nefcy et al. |

OTHER PUBLICATIONS

Nefcy, Bernard D. et al., "Methods and System for Operating a Powertrain During Regenerative Braking," U.S. Appl. No. 14/754,256, filed Jun. 29, 2015, 45 pages.

*Primary Examiner* — Tan Q Nguyen
(74) *Attorney, Agent, or Firm* — David Kelley; McCoy Russell LLP

(57) ABSTRACT

Systems and methods for operating a transmission of a hybrid powertrain that includes a motor/generator are described. The systems and methods may classify transmission degradation in response to an estimated transmission input shaft speed that is determined from transmission output shaft speed. In one example, transmission degradation may be correctable transmission degradation, partial transmission degradation, and continuous transmission degradation.

8 Claims, 8 Drawing Sheets

METHODS AND SYSTEM FOR MITIGATING UNDESIRABLE CONDITIONS DURING REGENERATIVE BRAKING

FIELD

The present description relates to methods and a system for operating a powertrain of a hybrid vehicle during regenerative braking. The methods and systems may be particularly useful for hybrid vehicles that may provide input to a transmission via an electric machine.

BACKGROUND AND SUMMARY

A hybrid vehicle may selectively enter and exit a regeneration mode or regenerative braking where the vehicle's kinetic energy is converted to electrical energy and stored for later use. The vehicle may enter regeneration mode during times when driver demand is low, such as when the hybrid vehicle is traveling down a road that has a negative grade. An electric machine provides a negative torque to the hybrid vehicles powertrain during regeneration. The negative torque helps to provide vehicle braking, but vehicle braking may also be provided by friction brakes. If negative torque provided by the electric machine is not applied to the vehicle's wheels due to transmission degradation, the vehicle may not decelerate at a desired rate.

One or more transmission components or control commands may temporarily provide less than desired transmission operation during regeneration. For example, a transfer function that describes clutch torque capacity versus clutch pressure may over estimate clutch torque capacity during a shift. Consequently, the clutch may slip when it is applied; thereby causing the transmission's input shaft speed to be reduced more than is desired. In other examples, the clutch transfer capacity may be reduced due to a partial line blockage or degraded control solenoid. Consequently, the clutch may transfer a fraction of regeneration torque from the wheels to the electric machine. In still other examples, the torque transfer capacity of a clutch may be completely degraded so that only a small amount of regenerative torque is transferred from vehicle wheels to the electric machine. It would be desirable to recover from the above mentioned conditions of transmission degradation in a way that continues to provide regenerative braking and that reduces the possibility of degraded vehicle drivability.

The inventors herein have recognized the above-mentioned issues and have developed a powertrain operating method, comprising: predicting a transmission input shaft speed from a transmission output shaft speed; adjusting a regeneration torque of an electric machine coupled to the transmission in response to an actual transmission input shaft speed minus the predicted transmission input shaft speed and a type of transmission degradation.

By reducing a regeneration torque toward a value of zero in response to transmission input shaft speed minus a predicted transmission input shaft speed and a characterization of a type of transmission degradation, it may be possible to provide the technical result of gracefully recovering from a condition of transmission degradation during regeneration. In some examples, the condition of transmission degradation may be during a downshift or while a transmission clutch is commanded closed. Further, it may be possible to reduce subsequent driveline torque disturbances by avoiding commanding clutches that may be classified as degraded.

The present description may provide several advantages. Specifically, the approach may provide improved recovery from conditions of transmission degradation. In addition, the approach may selectively apply different mitigating techniques that may be more suitable for types of degradation encountered. Further, the approach may reduce a regenerative torque so that at least some regenerative braking may be provided during some conditions of transmission degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
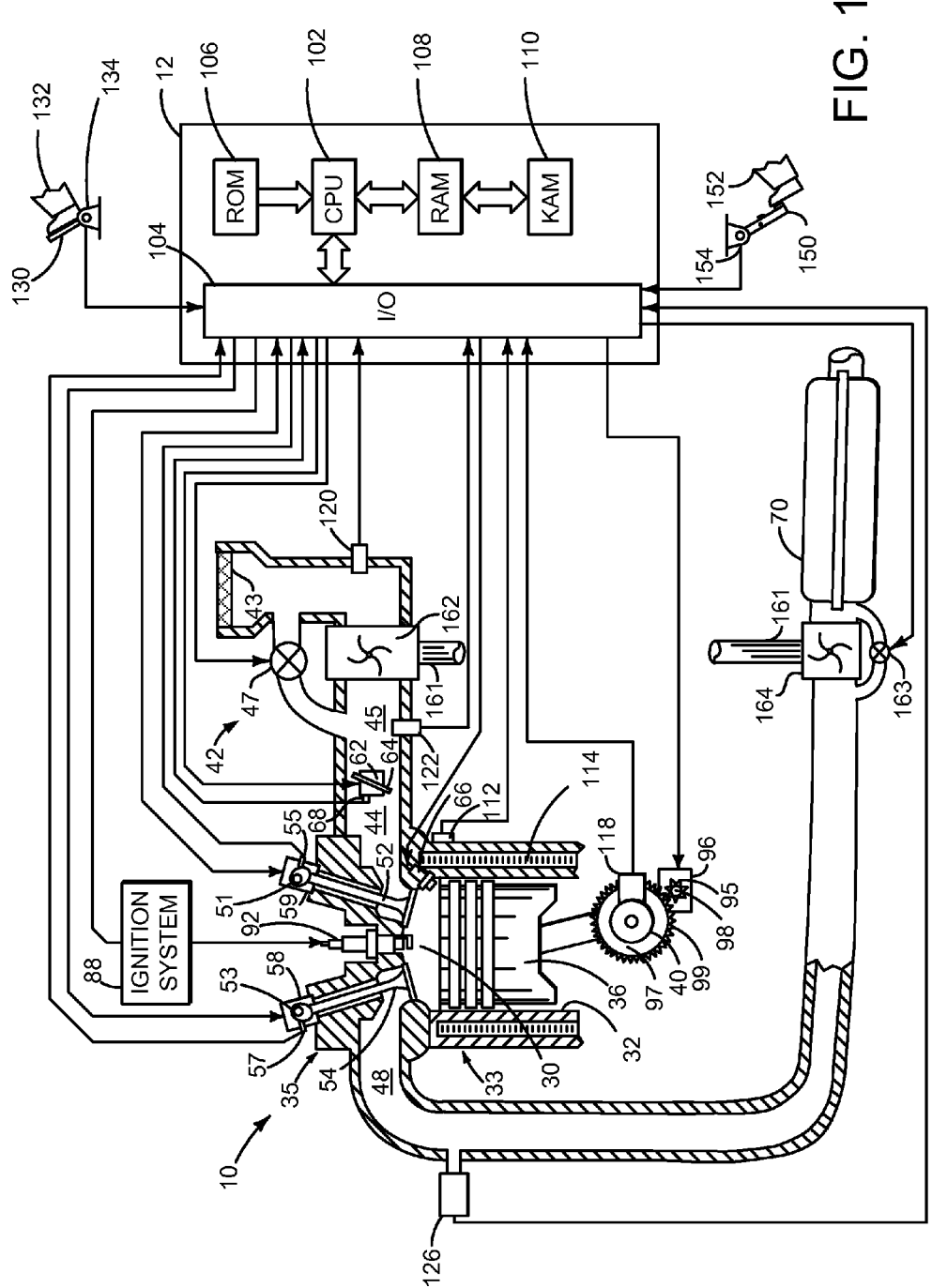
FIG. 1 is a schematic diagram of an engine.
Figure 2:
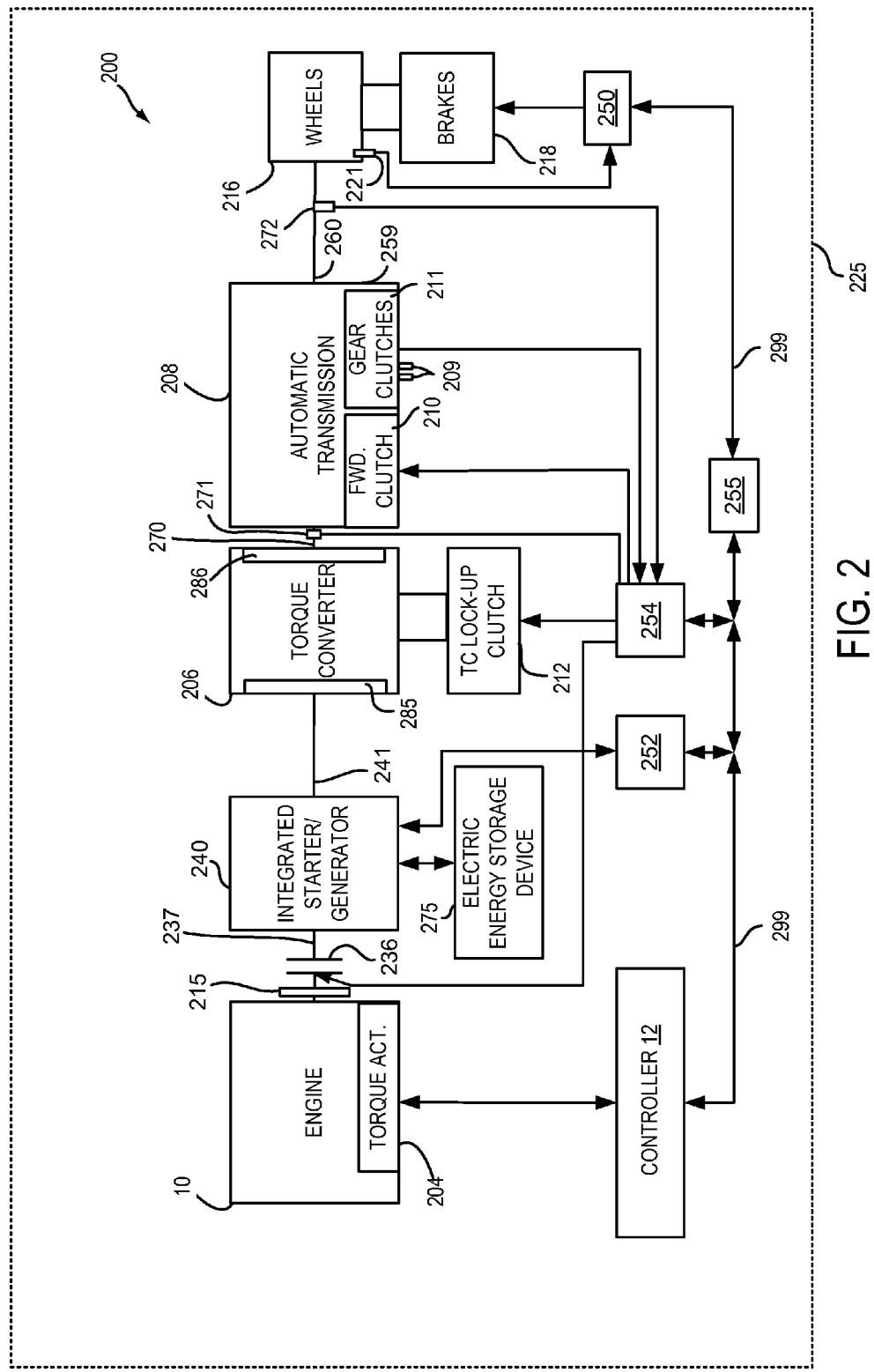
FIG. 2 is a schematic diagram of a hybrid vehicle powertrain.

The present description is related to monitoring a powertrain of a hybrid vehicle during regeneration. The hybrid vehicle may include an engine as is shown in FIG. 1. The engine of FIG. 1 may be included in a powertrain as is shown in FIG. 2. The powertrain may be monitored during operating conditions such as are shown in FIGS. 3-6. The powertrain may be monitored and controlled according to the method shown in FIG. 6. The method of FIG. 7 provides different ways to recover from different types of transmission degradation.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain 200. The powertrain of FIG. 2 includes engine 10 shown in FIG. 1. Powertrain 200 is shown including vehicle system controller 255, engine controller 12, electric machine controller 252, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque to provide a desired rate of vehicle deceleration. The desired wheel torque may be provided by vehicle system controller requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250.

In this example, powertrain 200 may be powered by engine 10 and electric machine 240. In other examples, engine 10 may be omitted. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of powertrain disconnect clutch 236 through dual mass flywheel 215. Disconnect clutch 236 may be electrically or hydraulically actuated. The downstream side of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed.

In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271. Transmission controller 254 may receive transmission output shaft torque from torque sensor 272. Alternatively, sensor 272 may be a position sensor or torque and position sensors. If sensor 272 is a position sensor, controller 254 differentiates a position signal to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a system, comprising: an engine; a motor/generator; a disconnect clutch positioned in a powertrain between the engine and the motor; a transmission coupled to the motor/generator; and a controller including executable instructions stored in non-transitory memory for deactivating one or more transmission gears selectively activated via a clutch in response to an actual transmission input shaft speed minus a predicted transmission input shaft speed being less than a threshold value. The system includes where the predicted transmission input shaft speed is provided by multiplying a transmission output shaft speed by a presently selected transmission gear ratio. The system further comprises additional instructions to reduce a negative torque provided by the motor/generator in response to the actual transmission input shaft speed minus the predicted transmission input shaft speed being less than the threshold value. The system includes where the negative torque provided by the motor/generator is zero. The system further comprises additional instructions to adjust a transfer function of a clutch in response to the actual transmission input shaft speed minus the predicted transmission input shaft speed being less than the threshold value. The system further comprise additional instructions to reduce a regenerative torque in response to the actual transmission input shaft speed minus the predicted transmission input shaft speed being less than the threshold value.

Figure 3:
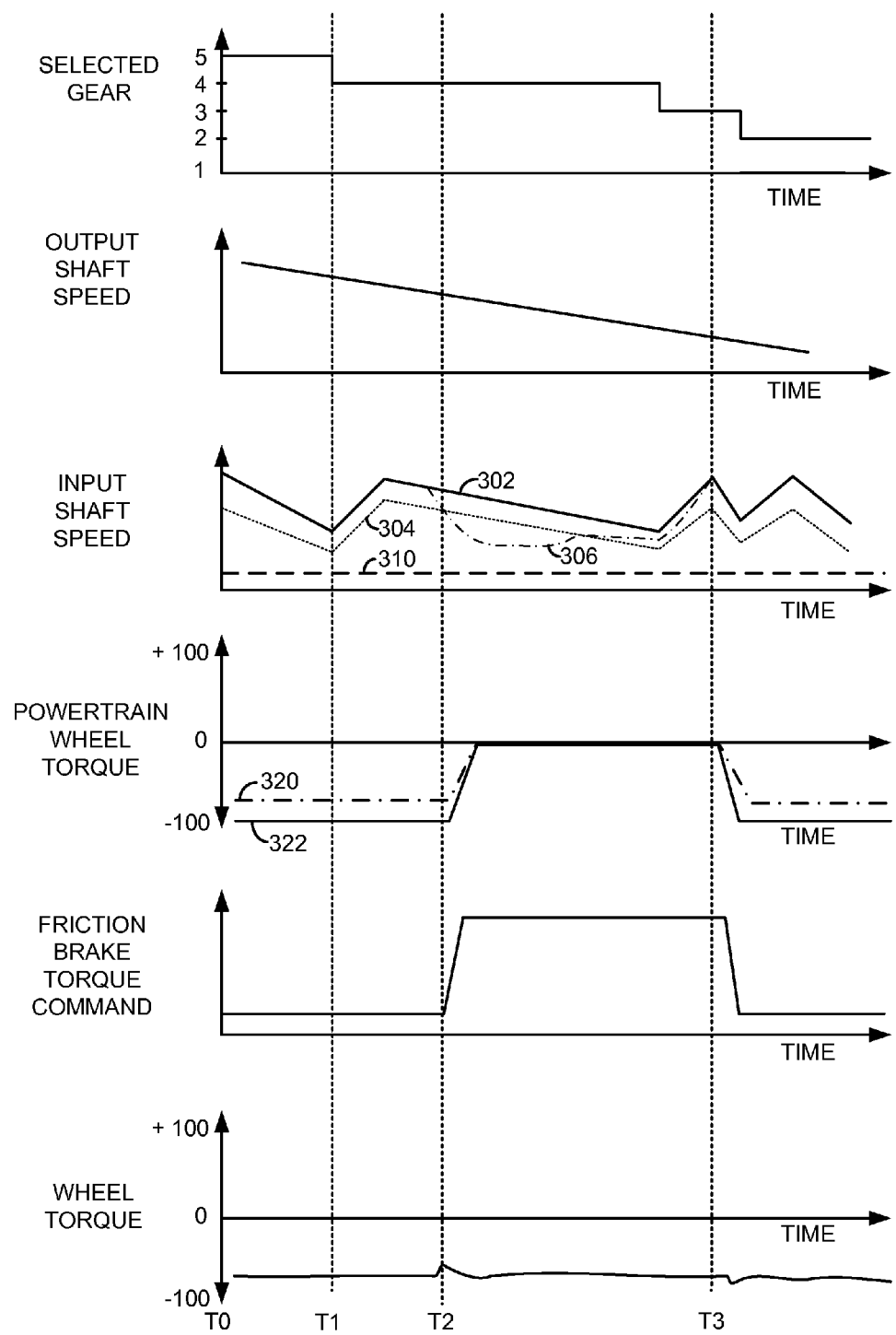
FIGS. 3-6 show different example conditions for monitoring a transmission and taking mitigating actions in response to an indication of degradation.

Referring now to FIG. 3, an example sequence performed according to the method of FIG. 7 is shown. The sequence of FIG. 3 may be provided by the system of FIGS. 1 and 2. The various plots of FIG. 3 are time aligned and occur at a same time. Vertical lines at times T1-T3 represent times of particular interest in the sequence. The prophetic sequence shown in FIG. 3 represents a condition of transmission clutch degradation during regeneration mode.

The first plot from the top of FIG. 3 is a plot of selected transmission gear versus time. The vertical axis represents selected transmission gear and selected gears are identified along the vertical axis. The horizontal axis represents time. Time begins on the left side of the figure and increases to the right side of the figure.

The second plot from the top of FIG. 3 is a plot of transmission output shaft speed versus time. The vertical axis represents transmission output shaft speed and transmission output shaft speed increases in the direction of the vertical axis arrow. The horizontal axis represents time. Time begins on the left side of the figure and increases to the right side of the figure.

The third plot from the top of FIG. 3 is a plot of transmission input shaft speed versus time. The vertical axis represents transmission input shaft speed and transmission input shaft speed increases in the direction of the vertical axis arrow. The horizontal axis represents time. Time begins on the left side of the figure and increases to the right side of the figure. Curve 302 represents actual transmission input shaft speed for conditions when no transmission degradation is indicated. Curve 304 represents a predicted transmission input shaft speed minus a predetermined offset to allow for allowable transmission input shaft speed variation. Curve 306 represents transmission input shaft speed during a condition of transmission clutch degradation where the method of FIG. 7 provides mitigating actions. Transmission degradation is not indicated when curve 306 is equal to curve 302, and curve 306 is equal to curve 302 when curve 306 is not visible. Line 310 represents a transmission input shaft speed below which transmission pump output flow or pressure is less than a desired amount to maintain desired transmission clutch pressures.

The fourth plot from the top of FIG. 3 is a plot of powertrain wheel torque versus time. The vertical axis represents powertrain wheel torque and negative powertrain wheel torque increases in a direction of the vertical axis arrow below the horizontal axis. The horizontal axis represents time. Time begins on the left side of the figure and increases to the right side of the figure. Trace 320 represents desired powertrain wheel torque (e.g., wheel torque provided via the ISG and transmission). Trace 322 represents a powertrain wheel torque limit (e.g., a powertrain wheel torque not to be exceeded).

The fifth plot from the top of FIG. 3 is a plot of friction brake torque versus time. The vertical axis represents friction brake torque command and the friction brake torque command increases (e.g., requests additional friction brake torque) in the direction of the vertical axis arrow. The horizontal axis represents time. The horizontal axis represents time. Time begins on the left side of the figure and increases to the right side of the figure.

The sixth plot from the top of FIG. 3 is a plot of wheel torque versus time. The vertical axis represents wheel torque and negative wheel torque increases in the direction of the vertical axis arrow below the horizontal axis. The horizontal axis represents time. The horizontal axis represents time. Time begins on the left side of the figure and increases to the right side of the figure. The wheel torque shown in the sixth plot is the powertrain wheel torque plus the friction brake torque.

At time T0, the transmission is in fifth gear and the vehicle is decelerating in response to a low driver demand torque (not shown). The vehicle is in regenerative braking mode. The transmission output shaft speed is decreasing as the vehicle speed decreases. The actual transmission input shaft speed is decreasing and the predicted transmission input shaft speed is also decreasing. Transmission degradation is not indicated since the transmission input shaft speed during degradation is a same value as the actual transmission input shaft speed. Actual transmission input speed is greater than level 310 so the transmission pump is operating as desired. The desired powertrain wheel torque is negative indicating powertrain braking. The powertrain wheel torque limit is greater than the desired powertrain wheel torque so powertrain wheel torque is not being limited. The friction brakes are applied at a low level.

At time T1, the transmission downshifts and the actual transmission input shaft speed and the predicted transmission input shaft speed begin to increase in response to the downshift. The transmission output shaft continues to decrease as the vehicle continues to decelerate in regenerative braking mode. The desired powertrain wheel torque and the powertrain wheel torque continue at a same level. The friction brake torque also continues at a same level or amount. The wheel torque is a constant negative value.

Shortly before time T2, the transmission input shaft speed during a condition of transmission clutch degradation begins to decrease in response to transmission degradation. The degradation may be from clutch degradation of the fourth gear clutch.

At time T2, the transmission input shaft speed during a condition of transmission clutch degradation (curve 306) is reduced to a value less than the predicted transmission input shaft speed. This condition initiates mitigating actions to reduce the possibility of transmission pump output being less than desired. If the transmission or transmission control (e.g., signals to operate the transmission) were not degraded, the transmission input shaft speed would continue as shown by curve 302. Because the transmission input shaft speed representing transmission degradation (curve 306) is less than the predicted transmission input shaft speed (curve 304), the powertrain wheel torque limit (curve 322) is reduced toward zero. Desired powertrain wheel torque (curve 320) is reduced by reducing negative ISG torque to a same level as the powertrain wheel torque limit in response to the powertrain wheel torque limit decreasing. Reducing the ISG torque allows the transmission input shaft speed to remain at a level greater than 310. Consequently, hydraulically operated transmission components may remain active. Additionally, the friction brake torque command is increased to fill in or provide the braking torque that was reduced by reducing the negative powertrain wheel torque limit. The wheel torque remains substantially constant (e.g., changes by less than 10%) even as powertrain wheel torque is reduced because friction braking torque is increased.

Between time T2 and time T3, the transmission is downshifted to third gear and third gear clutch holds third gear engaged. The transmission input shaft speed representing transmission degradation (curve 306) increases to a value greater than predicted transmission speed and eventually achieves the transmission input shaft speed when degradation is not present. The powertrain wheel torque limit is increased in response to the transmission input shaft speed being greater than the predicted transmission input shaft speed. The desired powertrain wheel torque increases in response to the powertrain wheel torque limit increasing. The friction brake torque is decreased to increase output of electrical power by the ISG in response to the increased powertrain wheel torque limit increasing. The wheel torque remains substantially constant.

In this way, it may be possible to compensate for degradation of one or more transmission components, such as a clutch, or undesirable controller performance, such as a clutch transfer function (e.g., a function that expresses torque transfer capacity of a clutch with respect to fluid pressure applied to the clutch) in a controller that may have inaccurate values. The compensation provides for rapid friction brake torque increases and decreases so that wheel torque may remain substantially constant even during transmission degradation while a vehicle is in regenerative braking mode.

Figure 4:
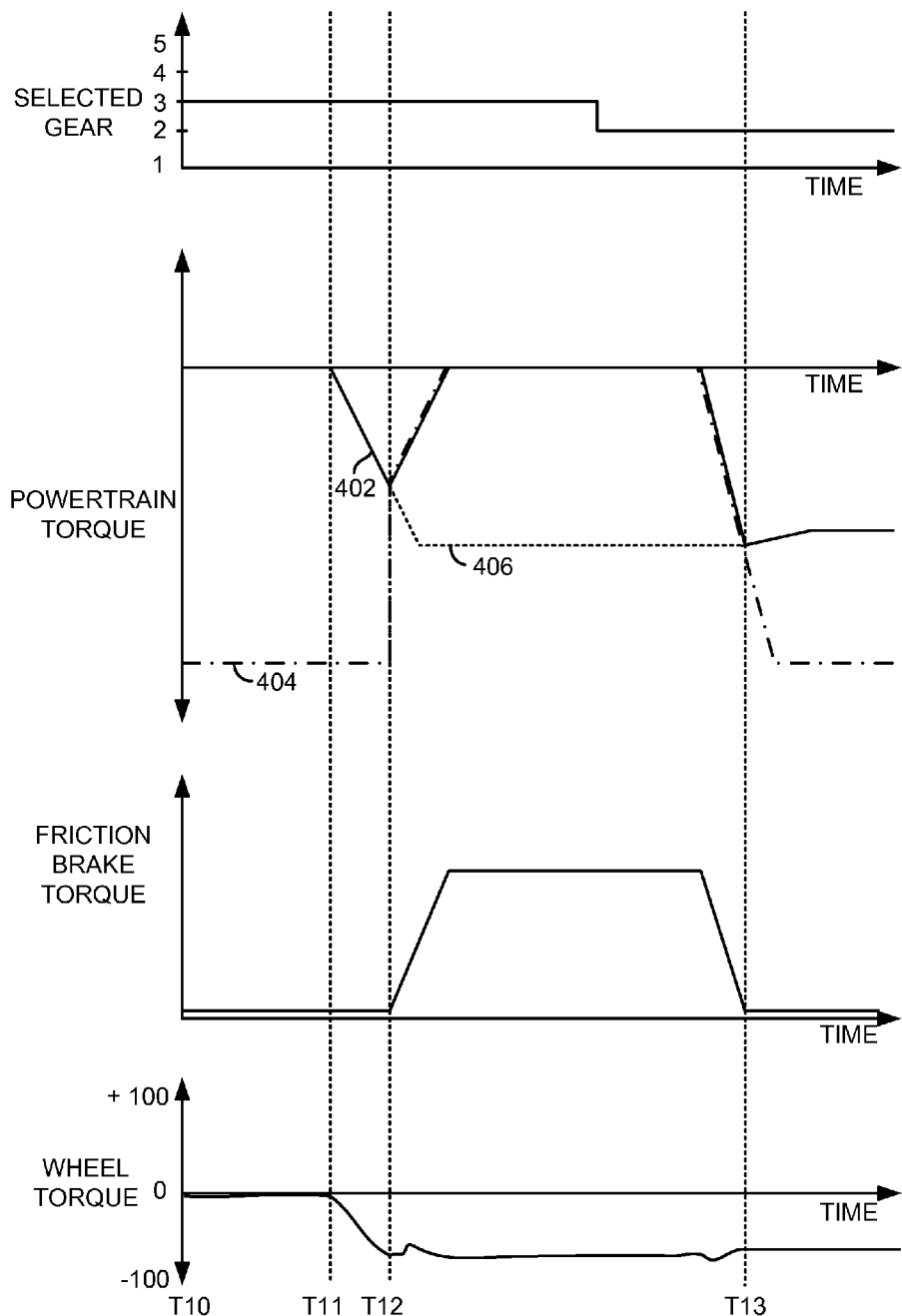

Referring now to FIG. 4, an example sequence showing adjustments to powertrain wheel torque control according to the method of FIG. 7 is shown. The sequence of FIG. 4 may be provided by the system of FIGS. 1 and 2. The various plots of FIG. 4 are time aligned and occur at a same time. Vertical lines at times T11-T13 represent times of particular interest in the sequence. The prophetic sequence shown in FIG. 4 represents a condition of transmission clutch control valve degradation during regeneration mode.

The first plot from the top of FIG. 4 is a plot of selected transmission gear versus time. The vertical axis represents selected transmission gear and selected gears are identified along the vertical axis. Time begins on the left side of the figure and increases to the right side of the figure.

The second plot from the top of FIG. 4 is a plot of powertrain wheel torque versus time. The vertical axis represents powertrain wheel torque and negative powertrain wheel torque increases in a direction of the vertical axis arrow below the horizontal axis. Time begins on the left side of the figure and increases to the right side of the figure. Trace 402 represents commanded powertrain wheel torque (e.g., wheel torque provided via the ISG and transmission) for degraded transmission conditions. Trace 404 represents a powertrain wheel torque limit (e.g., a powertrain wheel torque not to be exceeded). Trace 406 represents powertrain wheel torque (e.g., wheel torque provided via the ISG and transmission) for transmission conditions that are not degraded.

The third plot from the top of FIG. 4 is a plot of friction brake torque versus time. The vertical axis represents a friction brake torque command and the friction brake torque command increases (e.g., requests additional friction brake torque) in the direction of the vertical axis arrow. The horizontal axis represents time. Time begins on the left side of the figure and increases to the right side of the figure.

The fourth plot from the top of FIG. 4 is a plot of wheel torque versus time. The vertical axis represents wheel torque and negative wheel torque increases in the direction of the vertical axis arrow below the horizontal axis. The horizontal axis represents time. Time begins on the left side of the figure and increases to the right side of the figure. The wheel torque shown in the fourth plot is the powertrain wheel torque plus the friction brake torque.

At time T10, the transmission is in third gear and decelerating in response to a low driver demand torque (not shown). The vehicle is not in regenerative braking mode. Transmission degradation is not present and the powertrain wheel torque for degraded conditions is zero. Powertrain wheel torque for non-degraded conditions is also zero and the powertrain wheel torque limit is a large negative value indicating it is possible to induce a large negative torque to the powertrain via the ISG. The friction brakes are not applied as indicated by the zero friction brake torque command. The wheel torque is also at a low level.

At time T11, the vehicle enters regeneration mode and begins applying a negative powertrain wheel torque as indicated by the commanded powertrain wheel torque (curve 402) following the powertrain wheel torque for non-degraded conditions (curve 406). The powertrain wheel torque limit remains at a large negative value.

At time T12, degradation is indicated by actual transmission input shaft speed being less than predicted transmission input shaft speed (not shown). The powertrain wheel torque limit is reduced in response to actual transmission input shaft speed being less than predicted transmission input shaft speed. The commanded powertrain wheel torque is reduced to a same value as the powertrain wheel torque limit. If degradation had not been present, the commanded powertrain wheel torque would have been at the level of the powertrain wheel torque for non-degraded conditions. Because the powertrain wheel torque is reduced in response to an unexpected transmission input shaft speed, the desired level of braking is provided by increasing the friction brake torque demand and the friction brake torque. ISG negative torque is decreased in response to the reduced powertrain wheel torque limit (curve 404). Consequently, the transmission input shaft speed (not shown) is maintained at a higher level than if the powertrain wheel torque limit had not been decreased. The negative wheel torque increases in response to the increased friction braking torque and the initial increase in powertrain wheel torque.

Between time T12 and time T13, the transmission is downshifted from third gear to second gear. The shift solenoid for second gear is activated, thereby engaging second gear. Engaging second gear causes the actual transmission shaft input speed to increase to a value greater than the predicted transmission input shaft speed as time approaches time T13. The transmission wheel torque limit is increased in response to actual transmission input shaft speed being greater than predicted transmission input shaft speed (not shown). The commanded transmission wheel torque is increased in response to the increased transmission wheel torque limit. Further, the friction brake torque command is reduced in response to the increase in commanded transmission wheel torque increasing. The wheel torque continues at a near constant negative value to brake the vehicle.

At time T13, the friction brake torque command is reduced to zero in response to the commanded powertrain wheel torque providing a desired amount of powertrain braking equal to the powertrain wheel torque for non-degraded. Further, the friction brake torque command is reduced to zero, thereby allowing the powertrain to recover more energy from the vehicle.

In this way, operation of friction brakes may be coordinated with powertrain wheel torque production to provide a desired amount of vehicle braking even in conditions of transmission degradation. Further, friction braking may be reduced after the vehicle recovers from degraded conditions.

Figure 5:
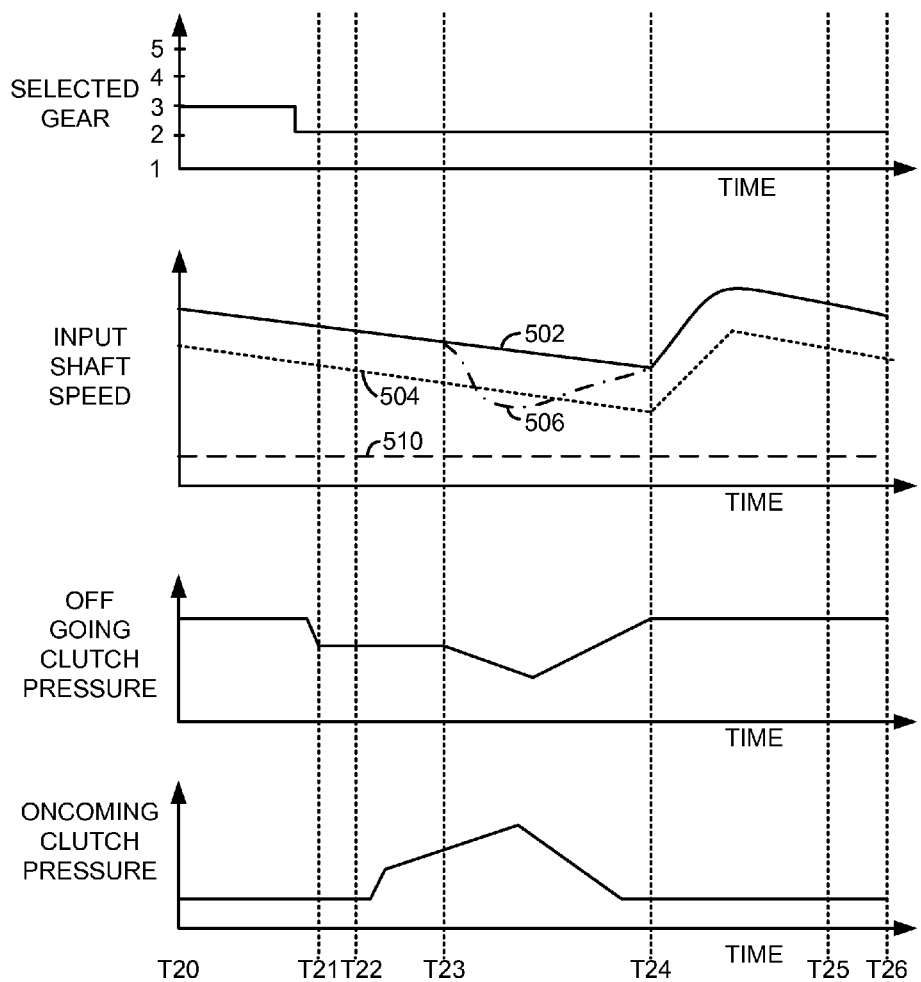

Referring now to FIG. 5, an example sequence performed according to the method of FIG. 7 is shown. The sequence of FIG. 5 may be provided by the system of FIGS. 1 and 2. The various plots of FIG. 5 are time aligned and occur at a same time. Vertical lines at times T21-T26 represent times of particular interest in the sequence. The prophetic sequence shown in FIG. 5 represents a condition of transmission clutch capacity degradation during regeneration mode.

The first plot from the top of FIG. 5 is a plot of selected transmission gear versus time. The vertical axis represents selected transmission gear and selected gears are identified along the vertical axis. The horizontal axis represents time. Time begins on the left side of the figure and increases to the right side of the figure.

The second plot from the top of FIG. 5 is a plot of transmission input shaft speed versus time. The vertical axis represents transmission input shaft speed and transmission input shaft speed increases in the direction of the vertical axis arrow. The horizontal axis represents time. Time begins on the left side of the figure and increases to the right side of the figure. Curve 502 represents transmission input shaft speed for non-degraded conditions. Curve 504 represents a predicted transmission input shaft speed minus a predetermined offset to allow for expected transmission input shaft speed variation. Curve 506 represents transmission input shaft speed during a condition of transmission clutch capacity degradation where the method of FIG. 7 provides mitigating actions. Transmission degradation is not indicated when curve 506 is equal to curve 502. Line 510 represents a transmission input shaft speed below which transmission pump output is less than a desired amount to maintain desired transmission clutch pressures.

The third plot from the top of FIG. 5 is a plot of off-going clutch pressure versus time. The vertical axis represents off-going clutch pressure and off-going clutch pressure increases in a direction of the vertical axis arrow. The horizontal axis represents time. Time begins on the left side of the figure and increases to the right side of the figure.

The fourth plot from the top of FIG. 5 is a plot of oncoming clutch pressure versus time. The vertical axis represents oncoming clutch pressure and oncoming clutch pressure increases in a direction of the vertical axis arrow. The horizontal axis represents time. Time begins on the left side of the figure and increases to the right side of the figure.

At time T20, the transmission is in third gear and the transmission input shaft speed for degraded and non-degraded conditions are a same value, and both are greater than the predicted transmission input shaft speed to indicate transmission clutch capacity degradation is not present. The off-going clutch pressure is at a higher level to indicate third gear is engaged. The oncoming clutch pressure is at a lower level to indicate second gear clutch is not engaged. Second gear is selected just before time T21.

At time T21, the shift boost phase is entered to preposition oncoming clutch (e.g., second gear clutch) surfaces prior to entering the torque phase and to reduce pressure in the off-going clutch (e.g., third gear clutch) before the off-going clutch begins to slip. Pressure in the off-going clutch is released and volume within the oncoming clutch begins to fill with fluid. The transmission input shaft speed for degraded and non-degraded conditions are a same value, and both are greater than the predicted transmission input shaft speed so transmission clutch capacity degradation is not indicated.

At time T22, the shift start phase is entered. Pressure in the off-going clutch is maintained while pressure in the oncoming clutch is increased increase pressure supplied to the oncoming clutch is increased. The transmission input shaft speed for degraded and non-degraded conditions are a same value, and both are greater than the predicted transmission input shaft speed so transmission clutch capacity degradation is not indicated.

At time T23, the shift enters the torque phase where negative ISG torque is split between a path through third gear and a path through second gear. The off-going clutch pressure is reduced while oncoming clutch pressure is increased.

Between time T23 and time T24, the oncoming clutch does not transfer an expected amount of torque. Therefore, the transmission input shaft speed is reduced to a speed less than the predicted transmission input shaft as is indicated by the transmission input shaft speed for degraded conditions being less than the predicted transmission input shaft speed. The transmission input shaft speed is reduced because of negative ISG torque supplied to the powertrain. The transmission speed for non-degraded conditions is at a level greater than the predicted transmission input shaft speed.

The off-going clutch pressure is increased and the oncoming clutch pressure is decreased in response to transmission input shaft speed being less than predicted transmission input shaft speed to reengage third gear. By reengaging third gear via the off-going clutch, the transmission input shaft speed is increased as indicated by the transmission input shaft speed for degraded conditions. The transmission input shaft speed is increased as the vehicle's kinetic energy is delivered to the ISG. Therefore, transmission input shaft speed remains at a level greater than 510 so that transmission pump pressure may be maintained at a desired level. Thus, reengaging third gear via the off-going clutch mitigates the possibility of the transmission pump outputting less pressure than is desired.

At time T24, the transmission enters the inertia phase where the slip of oncoming clutch would have been reduced. However, since pressure to the off-going clutch is increasing, slip of the third gear, or formerly off-going clutch, is reduced. Pressure in the oncoming clutch (e.g., second gear clutch) remains at a low level so that two gears are not engaged.

Between time T25 and time T26, the transmission shift enters the end phase where the third gear clutch (formerly off-going clutch) is fully locked and slip is eliminated. If transmission input shaft speed is reduced to near level 510, the transmission may be downshifted to first gear instead of second gear.

In this way, pressure may be controlled in off-going and oncoming clutches to reduce the possibility of transmission input shaft speed being reduced to less than a threshold level where transmission pump output is less than a threshold. Because the vehicle is in regeneration mode, the negative ISG torque tends to increase deceleration of the transmission input shaft during a downshift unless the oncoming gear has the capacity to fully engage. The sequence of FIG. 5 may reduce the possibility of reducing transmission input shaft speed to a speed less than a threshold speed where transmission output is less than a threshold desired output (e.g., less than a desired flow rate and/or pressure).

Figure 6:
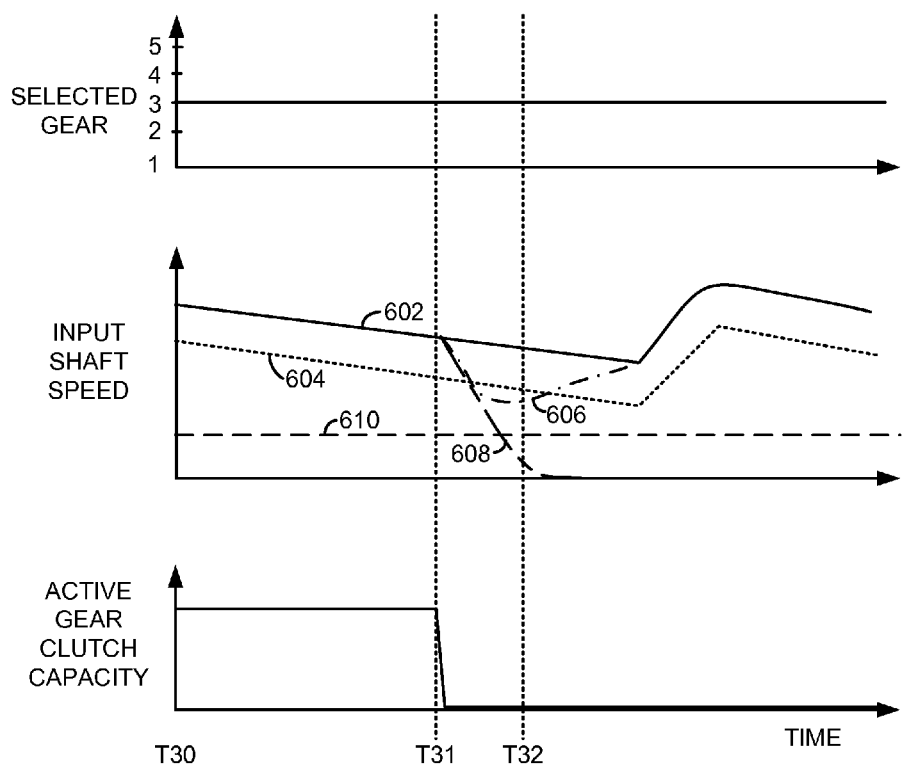
Figure 7:
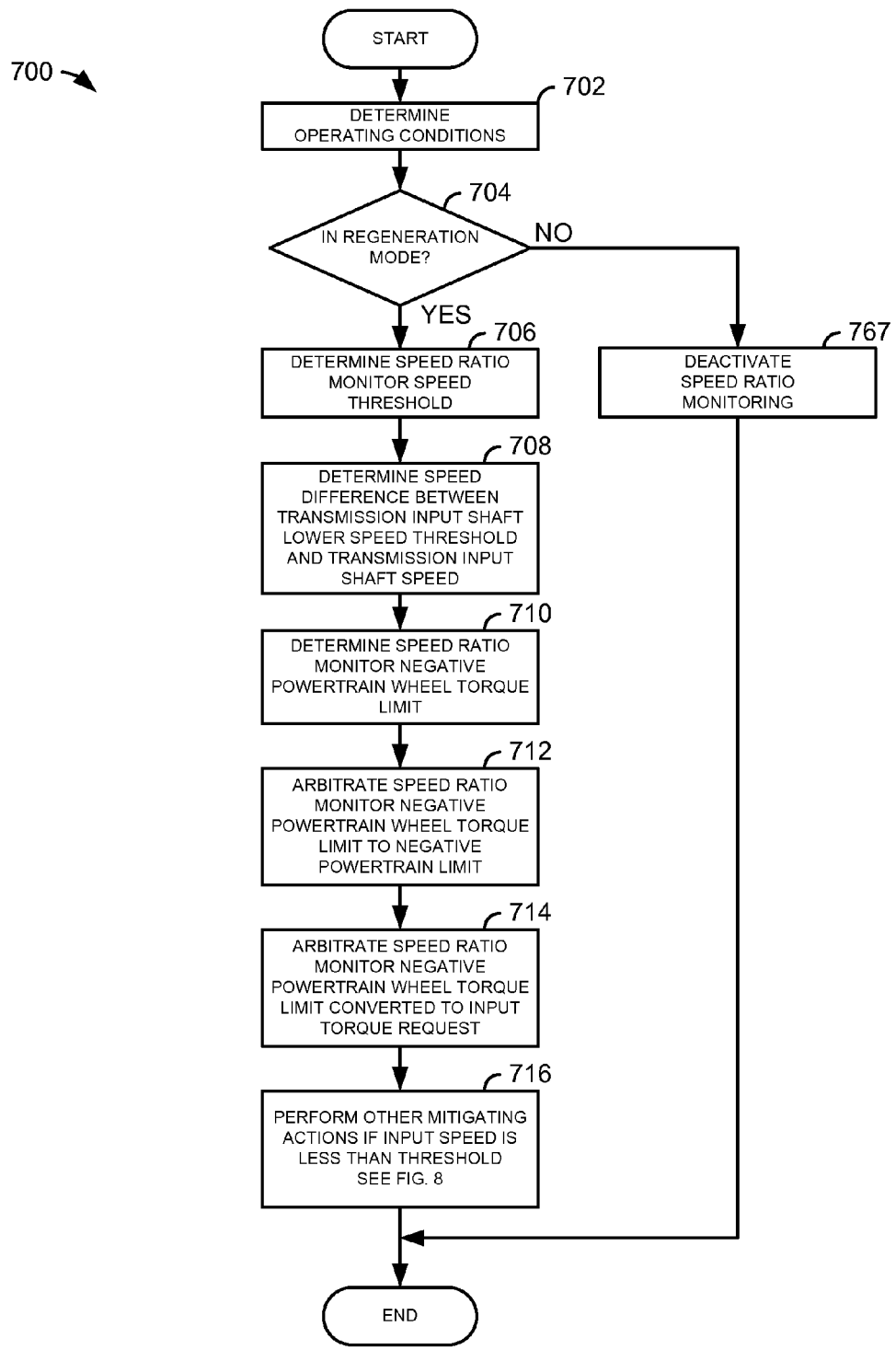
FIG. 7 shows an a flowchart for an example method for operating a vehicle powertrain.

Referring now to FIG. 6, an example sequence performed according to the method of FIG. 7 is shown. The sequence of FIG. 6 may be provided by the system of FIGS. 1 and 2. The various plots of FIG. 6 are time aligned and occur at a same time. Vertical lines at times T31-T33 represent times of particular interest in the sequence. The prophetic sequence shown in FIG. 6 represents a condition of transmission clutch capacity degradation during regeneration mode.

The first plot from the top of FIG. 6 is a plot of selected transmission gear versus time. The vertical axis represents selected transmission gear and selected gears are identified along the vertical axis. The horizontal axis represents time. Time begins on the left side of the figure and increases to the right side of the figure.

The second plot from the top of FIG. 6 is a plot of transmission input shaft speed versus time. The vertical axis represents transmission input shaft speed and transmission input shaft speed increases in the direction of the vertical axis arrow. The horizontal axis represents time. Time begins on the left side of the figure and increases to the right side of the figure. Curve 602 represents transmission input shaft speed for non-degraded conditions. Curve 604 represents a predicted transmission input shaft speed minus a predetermined offset to allow for allowable transmission input shaft speed variation. Curve 606 represents transmission input shaft speed during a condition of transmission clutch capacity degradation where the method of FIG. 7 provides mitigating actions. Transmission degradation is not indicated when curve 606 is equal to curve 602. Curve 608 represents transmission input shaft speed if no mitigating actions are taken to maintain transmission input shaft speed above the speed of line 610. Line 610 represents a transmission input shaft speed below which transmission pump output is less than a desired amount to maintain desired transmission clutch pressures.

The third plot from the top of FIG. 6 is a plot of active gear clutch capacity versus time. The vertical axis represents active gear clutch capacity (e.g., amount of torque the clutch may transfer) and active gear clutch capacity increases in a direction of the vertical axis arrow. The horizontal axis represents time. Time begins on the left side of the figure and increases to the right side of the figure.

At time T30, the transmission is in third gear and the transmission input shaft speed for degraded and non-degraded conditions are a same value, and both are greater than the predicted transmission input shaft speed to indicate transmission clutch capacity degradation is not present. The active gear clutch capacity is at a higher level to indicate the active gear clutch capacity is high.

At time T31, the active clutch capacity decreases. The decrease may be a result of a line leak, clutch seal degradation, or shift solenoid degradation. Because the vehicle is in regeneration mode, the negative ISG torque would decelerate the transmission input shaft speed as shown by curve 608 if mitigating actions where not taken. However, the method of FIG. 7 recognizes that transmission input shaft speed is less than predicted transmission input shaft speed. Therefore, the powertrain wheel torque limit is reduced toward zero torque from a large negative torque value. Consequently, the transmission input shaft speed follows the trajectory of curve 606 instead of curve 608. If clutch capacity would not have been reduced, transmission input shaft speed would have followed the trajectory of curve 602 falling below level 610.

In the context of the description of FIGS. 3-6, a powertrain wheel torque of is reduced when adjusted from −200 N-m to −100 N-m since less negative powertrain wheel torque is applied to the wheels at −100 N-m than at −200 N-m.

Referring now to FIG. 7, a method for operating a vehicle powertrain is shown. At least portions of method 700 may be implemented as executable controller instructions stored in non-transitory memory. Additionally, portions of method 700 may be actions taken in the physical world to transform an operating state of an actuator or device.

At 702, method 700 determines vehicle operating conditions. Vehicle operating conditions may include but are not limited to vehicle speed, driver demand torque, transmission input shaft speed, battery state of charge, and brake pedal position. Vehicle operating conditions may be determined via a controller querying its inputs. Method 700 proceeds to 704 after operating conditions are determined.

At 704, method 700 judges if the vehicle is in a regeneration mode. During regeneration mode, the vehicle's kinetic energy is converted into electrical energy and stored in a storage device. The vehicle's ISG provides a negative torque to the powertrain and wheels when the vehicle is operating in regeneration mode. Regeneration mode may be entered when a group of conditions are met. For example, the vehicle may enter regeneration mode if battery state of charge is less than a threshold, driver demand torque is less than a threshold, the torque converter clutch is locked, and vehicle speed is greater than a threshold. If method 700 judges that the vehicle is in regeneration mode, the answer is yes and method 700 proceeds to 706. Otherwise, the answer is no and method 700 proceeds to 767.

At 767, method 700 deactivates transmission speed ratio monitoring (e.g., comparing predicted transmission input shaft speed to actual transmission input shaft speed) and operates the ISG and engine based on vehicle operating conditions including driver demand torque, battery state of charge, and vehicle speed. Method 700 exits after deactivating transmission speed ratio monitoring.

At 706, method 700 determines a transmission input shaft lower speed threshold, which may also be referred to as a predicted transmission input shaft speed as described in FIGS. 3-6. In one example, the transmission input shaft lower speed threshold may be determined via the following equation:

$$N_{IS\_threshold} = (OSS \cdot SR) - \text{Offset}(T_{input}, N_{IS}, \text{Oil}_T)$$

where $N_{IS\_threshold}$ is the transmission input shaft lower speed threshold (e.g., curve 304 of FIG. 3), OSS is transmission output shaft speed, SR is transmission output shaft speed to input shaft speed ratio or the gear ratio from the output shaft to the input shaft, Offset is an offset speed which takes clutch slippage during shifting into consideration, $T_{input}$ is transmission input shaft torque, $N_{IS}$ is input shaft speed, and $\text{Oil}_T$ is transmission oil temperature.

Additionally, in some examples, the speed threshold $N_{IS\_threshold}$ may be based on a calibration by gear. This calibration may also be linked to a transmission shift schedule. For example, if the downshift points for all $4^{th}$ gear downshifts (4-3, 4-2, 4-1) are always greater than 1200 RPM, then the speed threshold for $4^{th}$ gear may be a value of 1000 RPM. The transmission input speed shaft speed should not drop below 1000 RPM in the absence of degradation. If transmission input shaft speed is less than the 1000 RPM threshold, then the minimum input shaft torque is reduced from a larger negative torque toward zero torque, using reduced in a same way as used in the description of FIGS. 3-6. Method 700 proceeds to 708 after the transmission input shaft lower speed threshold is determined.

At 708, method 700 determines a speed difference between transmission input shaft lower speed threshold and the transmission input shaft speed. The speed difference may be determined via the following equation:

$$N\text{diff} = N_1 - N_{IS\_threshold}$$

where Ndiff is the speed difference between transmission input shaft speed and transmission output shaft speed. Method 700 proceeds to 710 after the speed difference is determined.

At 710, method 700 determines a negative powertrain wheel torque limit (e.g., curve 322 of FIG. 3). The negative powertrain wheel torque limit is a not to be exceeded threshold negative wheel torque produced via the ISG at the vehicle's wheels. For example, if the negative powertrain wheel torque limit is −100 N-m, the ISG torque produced at the wheels is not to exceed −100 N-m. Thus, the ISG may produce −99 N-m at the wheels without exceeding the negative powertrain wheel torque limit of −100 N-m. In one example, the negative powertrain wheel torque limit may be determined via the following equation:

$$T_{PW\_LIM} = T_{LIM}(N\text{diff}, N_{IS})$$

where $T_{PW\_LIM}$ is the negative powertrain wheel torque limit, $T_{LIM}$ is a function of empirically determined wheel torque limit values that are based on or indexed via $N_{diff}$ and $N_{IS}$. The table or function may be include values such that for large positive speed differences (e.g., Ndiff=$N_{IS}$−$N_{IS\_threshold}$), the negative powertrain wheel torque allows larger negative wheel torque (e.g., −100 N-m); for small positive speed differences, the negative powertrain wheel torque allows for smaller non-limiting negative wheel torques (e.g., −20 N-m); for small negative speed differences, a small amount of negative powertrain wheel torque limiting is provided (e.g., a 20 N-m reduction to maximum negative powertrain wheel torque), for large negative speed differences, a larger amount of negative powertrain wheel torque limiting is provided (e.g., an 80 N-m reduction to maximum negative powertrain wheel torque).

In some examples, the negative powertrain wheel torque limit may also be dynamically set using integral control based on the speed difference. With this approach, the negative powertrain wheel torque limit may be driven towards zero until the input speed rises above the speed threshold $N_{IS\_threshold}$. The rate that the speed increases depends on a speed difference magnitude. The wheel torque limit may also be latched or held at a single value for the duration of the transmission shaft speed under the threshold speed event (e.g., until other mitigating actions are performed). Once a new gear is selected (or similar), then the negative powertrain wheel torque limit may be removed. Method 700 proceeds to 712 after the negative powertrain wheel torque limit is determined.

At 712, method 700 arbitrates the negative powertrain wheel torque limit $T_{PW\_LIM}$ and a negative powertrain torque limit. As discussed with regard to FIG. 2, a desired negative wheel torque may be requested during regeneration based on operating conditions such as brake pedal position and vehicle speed. Desired negative wheel torque is equal to desired friction brake torque plus desired negative powertrain wheel torque. In one example, the brake controller supplies the desired friction brake torque request based on the desired negative powertrain wheel torque minus the desired negative powertrain wheel torque. The desired negative powertrain wheel torque and desired negative wheel torque may be broadcast to the friction brake controller by the vehicle system controller so that the brake controller may determine the desired friction brake torque. The desired negative powertrain wheel torque may be reduced to a level of the negative powertrain wheel torque limit or a negative powertrain torque limit adjusted for the presently selected transmission gear ratio. In one example, the desired negative powertrain wheel torque is not allowed to exceed a lower value of the negative powertrain wheel torque limit or the negative powertrain torque limit adjusted for the presently selected transmission gear ratio. For example, if the desired negative wheel torque is −35 N-m, and if the negative powertrain wheel torque limit is −20 N-m, the desired negative powertrain wheel torque is −30 N-m, and the negative powertrain torque limit adjusted for presently selected transmission gear ratio is −25 N-m, −20 N-m of negative powertrain wheel torque is provided by the powertrain and −15 N-m is provided by friction brakes. Thus, the sum of the braking torque and the negative powertrain wheel torque is the desired negative wheel torque. Friction brakes are adjusted at 712 based on the negative powertrain wheel torque limit, the desired negative powertrain wheel torque, the desired negative wheel torque, and the negative powertrain torque limit. If the desired negative powertrain wheel torque is less than the lower value of the negative powertrain wheel torque limit and the negative powertrain torque limit adjusted for presently selected transmission gear ratio, the desired negative powertrain wheel torque is not adjusted. Method 700 proceeds to 714 after the negative powertrain wheel torque limit $T_{PW\_LIM}$ and a negative powertrain torque limit are arbitrated.

At 714, method 700 arbitrates the negative powertrain wheel torque limit $T_{PW\_LIM}$ to a transmission input shaft torque request. The negative powertrain wheel torque limit may be converted to a negative powertrain input shaft torque limit by multiplying the negative powertrain wheel torque limit by the presently selected transmission gear ratio. Likewise, the negative powertrain wheel torque may be converted to a negative powertrain input shaft torque by multiplying the negative powertrain wheel torque by the presently selected transmission gear ratio. The desired or requested transmission input shaft torque is not allowed to exceed the lesser of the negative powertrain wheel torque limit multiplied by the presently selected transmission gear ratio or the desired negative powertrain wheel torque multiplied by the presently selected transmission gear ratio. The transmission input shaft torque is adjusted at 714 by adjusting ISG torque to the desired transmission input shaft torque. If the desired transmission input shaft torque is less than the lower value of the negative powertrain wheel torque limit multiplied by the presently selected transmission gear ratio or the desired negative powertrain wheel torque multiplied by the presently selected transmission gear ratio, the desired transmission input shaft torque is not adjusted. Method 700 proceeds to 716 after transmission input shaft torque is adjusted.

Figure 8:
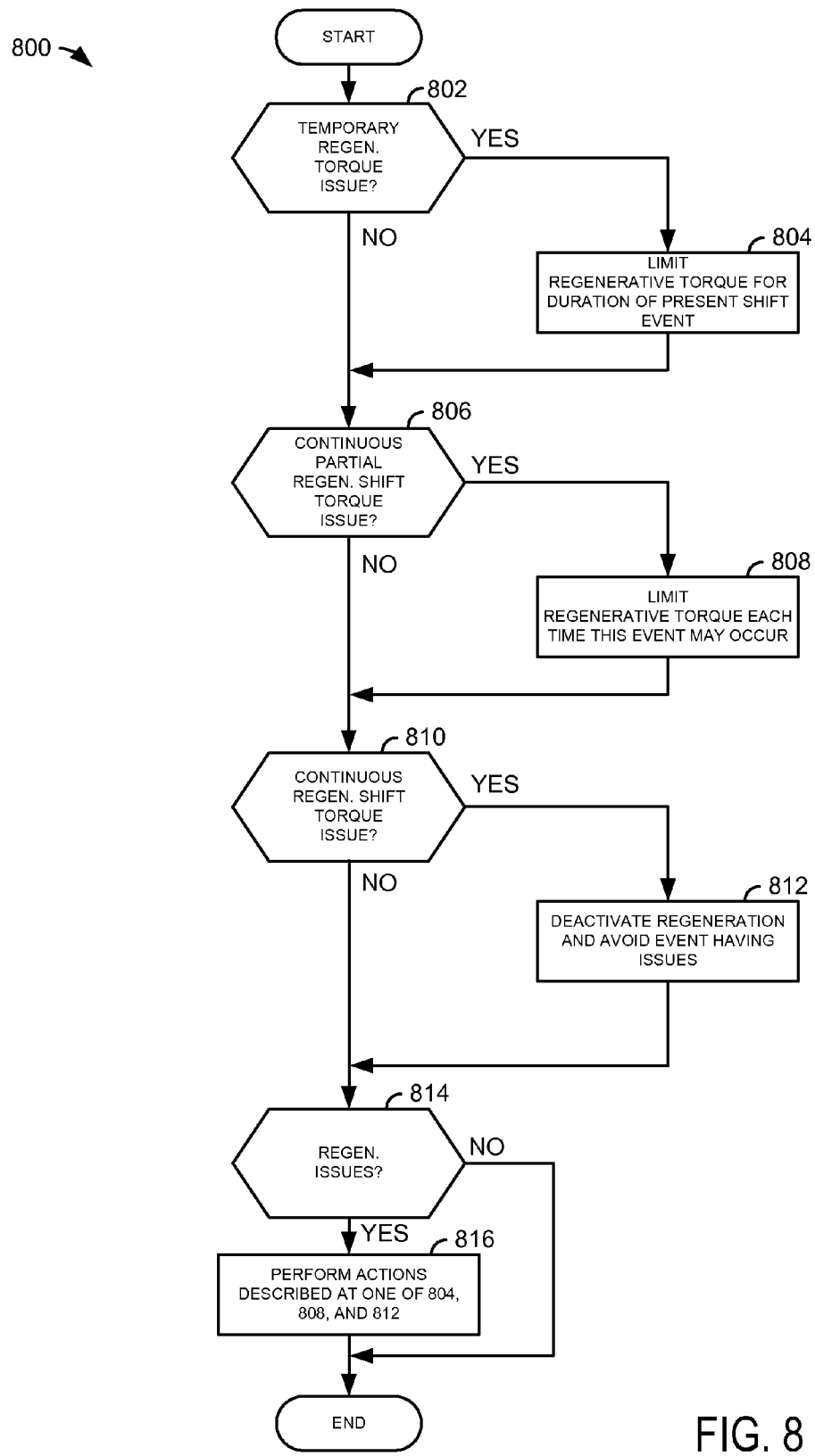
FIG. 8 shows an extension of the flowchart FIG. 7 that describes methods for recovering from conditions of transmission degradation.

At 716, method 700 performs other mitigating actions described in the method of FIG. 8 if the transmission input shaft speed is less than the threshold speed determined at 706 or based on the difference determined at 708. Method 700 proceeds to exit after mitigating or recovery actions are performed.

Referring now to FIG. 8, method 800 judges whether or not to perform recovery or mitigating actions while the vehicle is operating in a regeneration mode. Method 800 is an extension of method 700.

At 802, method 800 judges if there is a correctable or temporary regeneration transmission torque issue. In one example, method 800 may judge that there is a temporary regeneration transmission torque issue if during a downshift from a higher gear to a lower gear, the actual transmission input shaft speed is less than the predicted transmission input shaft speed. Further, method 800 may require that less than a predetermined number of controller adjustments have been made to correct the regeneration transmission torque issue to assign or categorizing the regeneration transmission torque issue as a correctable or temporary regeneration transmission torque issue. For example, if during a downshift from a higher gear to a lower gear, the actual transmission input shaft speed is less than the predicted transmission input shaft speed because an on-coming clutch does not carry its expected torque capacity when transmission fluid pressure supplied to the clutch is less than a threshold pressure, method 800 may assign transmission fluid pressure as cause of a correctable or temporary regeneration transmission issue if transmission oil pressure has not been assigned or categorized as cause of a correctable or temporary regeneration transmission torque issue a predetermined number of times during similar downshift conditions. The transmission fluid pressure may be assigned or categorized as the correctable or temporary regeneration transmission torque issue based on transmission fluid pressure and actual transmission input shaft speed being less than predicted transmission input shaft speed.

In another example, if during a downshift from a higher gear to a lower gear, the actual transmission input shaft speed is less than the predicted transmission input shaft speed because an on-coming clutch does not carry its expected torque capacity when transmission fluid pressure supplied to the clutch is at a threshold pressure, method 800 may assign a clutch transfer function as cause of a correctable or temporary regeneration transmission issue if the clutch transfer function has not been assigned or categorized as cause of the correctable or temporary regeneration transmission torque issue a predetermined number of times during similar downshift conditions. The clutch transfer function may be assigned or categorized as the correctable or temporary regeneration transmission torque issue based on transmission fluid pressure being above a threshold pressure, transmission solenoid control valves operating as commanded (e.g., based on solenoid valve position signals), and actual transmission input shaft speed being less than predicted transmission input shaft speed.

If method 800 judges a correctable or temporary regeneration transmission torque issue is present, the answer is yes and method 800 proceeds to 804. Otherwise, the answer is no and method 800 proceeds to 806.

At 804, method 800 adjusts the powertrain wheel torque limit as described at 710 by adjusting values in the $T_{LIM}$ function. In one example, values in the $T_{LIM}$ function are adjusted to provide a wheel torque limit that is varied based on the present commanded powertrain regeneration torque and the speed difference between the transmission input shaft speed and the transmission output shaft speed. For example, the wheel torque limit is reduced closer toward zero torque (e.g., reduced in magnitude) and may include zero torque when the difference in transmission input shaft speed and transmission output shaft speed is greater than a first threshold speed. In this way, larger speed differences result in a wheel torque limit that is closer to zero torque. For smaller speed differences where the difference in transmission input shaft speed and transmission output shaft speed is less than a first threshold speed, the negative wheel torque limit is larger in magnitude and farther from zero torque. Further, in some examples, transfer functions describing actuator operation are adjusted in an attempt to eliminate the correctable or temporary regeneration transmission torque issue. The transfer functions may include but are not limited to clutch apply pressure versus clutch torque capacity, transmission fluid line pressure versus line pressure solenoid duty cycle, and clutch control solenoid transmission fluid output pressure versus clutch control solenoid duty cycle. The regeneration wheel torque limit returns to its original value and the correctable or temporary regeneration transmission torque issue condition has been cleared from memory after the transmission shift is complete. However, method 800 may keep track of a number of repeated correctable or temporary regeneration transmission torque issues that occur during similar conditions. Method 800 proceeds to 808 after mitigating or recovery actions are performed.

At 806, method 800 judges if there is a continuous partial regeneration transmission torque issue. In one example, method 800 may judge that there is a continuous partial regeneration transmission torque issue if during a downshift from a higher gear to a lower gear, the actual transmission input shaft speed is less than the predicted transmission input shaft speed and more than a predetermined number of correctable or temporary regeneration transmission torque issues occur for similar conditions. In still other examples, method 800 may judge that there is a continuous partial regeneration transmission torque issue based on output of one or more sensors. For example, method 800 may judge that there is a continuous partial regeneration transmission degradation issue when a transmission clutch control solenoid is operating according to commands, transmission line pressure is at a desired pressure, but clutch pressure is less than is expected. The transmission clutch may be assigned or categorized as the continuous partial regeneration transmission torque issue based on clutch fluid pressure and actual transmission input shaft speed being less than predicted transmission input shaft speed. Additionally, the type of transmission degradation may be classified as continuous partial transmission degradation in response to a transmission clutch transferring less than a first threshold amount of torque and more than a second threshold amount of torque.

If method 800 judges a continuous partial regeneration transmission issue is present, the answer is yes and method 800 proceeds to 808. Otherwise, the answer is no and method 800 proceeds to 810.

At 808, method 800 adjusts the powertrain wheel torque limit as described at 710 by adjusting values in the $T_{LIM}$ function. In one example, values in the $T_{LIM}$ function are adjusted to provide a wheel torque limit that is varied based on the present commanded powertrain regeneration torque and the speed difference between the transmission input shaft speed and the transmission output shaft speed. For example, the wheel torque limit is reduced closer toward zero torque (e.g., reduced in magnitude) and may include zero torque when the difference in transmission input shaft speed and transmission output shaft speed is greater than a first threshold speed. The regeneration wheel torque limit remains at its adjusted value each time the vehicle enters regeneration under similar conditions. For example, if during a first shift from $5^{th}$ gear to $4^{th}$ gear during a first regeneration event, a continuous partial transmission regeneration issue is determined to be that $4^{th}$ gear has a low torque capacity due to low transmission fluid pressure in the clutch, during a subsequent shift from $5^{th}$ gear to $4^{th}$ gear during a second regeneration event, the lower wheel torque limit is applied during the downshifts. In this way, the lower wheel torque limit is applied during both downshifts from $5^{th}$ gear to $4^{th}$ gear when transmission input shaft speed is less than predicted transmission input shaft speed. Further, if the clutch in the $5^{th}$ gear to $4^{th}$ gear shift is used for other downshifts, the lower wheel torque limit is applied during the other downshifts so that the clutch showing degradation is compensated during all other downshifts during regeneration that use the degraded clutch. Method 800 proceeds to 810 after mitigating or recovery actions are performed.

At 810, method 800 judges if there is a continuous regeneration transmission torque issue. In one example, method 800 may judge that there is a continuous regeneration transmission torque issue if during a downshift from a higher gear to a lower gear, the actual transmission input shaft speed change to less than the predicted transmission input shaft speed in less than a predetermined amount of time. Alternatively, if transmission input shaft speed rate of change is greater than a threshold during a shift and transmission input shaft speed is less than predicted transmission input shaft speed, method 800 may judge that there is a continuous regeneration transmission torque issue. In other examples, method 800 may judge that there is a continuous regeneration transmission torque issue if one or more clutches are commanded fully closed to fully engage a gear and actual transmission input shaft speed is less than predicted transmission input shaft speed. In still other examples, the type of transmission degradation may be classified as continuous transmission degradation in response to a transmission clutch transferring less than the second threshold amount of torque.

If method 800 judges a continuous regeneration transmission issue is present, the answer is yes and method 800 proceeds to 812. Otherwise, the answer is no and method 800 proceeds to 814.

At 812, method 800 adjusts the powertrain wheel torque limit to zero. Additionally, the ISG may be transitioned from torque control mode (e.g., ISG torque is adjusted to a desired torque while ISG speed is allowed to change) to speed control mode (e.g., ISG speed is adjusted to a desire speed while ISG torque is varied to maintain the desired speed). The ISG speed is commanded to a speed that when multiplied by the engaged gear provides the present transmission output shaft speed. Further, the torque converter clutch may be commanded open and the transmission may be shifted to an alternate gear than the desired gear. In some examples, the alternate gear may be the gear being exited. For example, if a continuous regeneration transmission issue detected downshifting from $5^{th}$ gear to $4^{th}$ gear, $5^{th}$ gear may be reengaged. In other examples, a next lower gear may be selected. For example, if a continuous regeneration transmission issue detected downshifting from $5^{th}$ gear to $4^{th}$ gear, $3^{rd}$ gear may be reengaged. The regeneration torque may be increased after the new gear is engaged by increasing the magnitude of the regeneration wheel torque limit from zero. In some examples, the gear that exhibits degradation may not be attempted to be reengaged until service is performed on the vehicle. For example, if a continuous regeneration transmission issue is determined during a downshift from $3^{rd}$ gear to $2^{nd}$ gear when $2^{nd}$ gear clutch is applied, $2^{nd}$ gear may not be applied or attempted to be activated until service is performed on the transmission. Shifting into a gear may be avoided by removing a gear from a shift schedule that defines which transmission gear is engaged based on driver demand torque and vehicle speed. Method 800 proceeds to 814 after mitigating or recovery actions are performed.

At 814, method 800 judges if regeneration issues were determined at 802, 806, and 810. In one example, a bit in memory may be set for each of the described regeneration issues at 802, 806, and 810. If method 800 judges that regeneration issues are present, method 800 proceeds to 816. Otherwise, method 800 proceeds to exit.

At 816, method 800 continues to perform the mitigating actions described at 804, 808, and 812 for the type of regeneration issue detected. In one example, issues of greater severity are given priority. For example, if a continuous regeneration transmission issue is present mitigating actions described at 812 are performed instead of actions described at 808 for degradation of a same component or control feature. Method 800 proceeds to exit after mitigating actions are performed.

Thus, the method of FIGS. 7 and 8 may provide for a powertrain operating method, comprising: predicting a transmission input shaft speed from a transmission output shaft speed; adjusting a regeneration torque of an electric machine coupled to the transmission in response to an actual transmission input shaft speed minus the predicted transmission input shaft speed and a type of transmission degradation. The method includes where the type of transmission degradation is selected from a group including a correctable transmission degradation, partial continuous transmission degradation, or continuous transmission degradation. The method further comprising adjusting a transfer function so that a transmission clutch transfers a requested regeneration torque in response to the correctable transmission degradation.

In some examples, the method further comprises reconfiguring transmission operation to avoid shifting into a selected gear in response to continuous transmission degradation. The method includes where reconfiguring transmission operation includes adjusting a shift schedule in response to continuous transmission degradation. The method includes where the type of transmission degradation is based on a speed difference between a transmission input shaft and a transmission output shaft.

The method of FIGS. 6 and 7 also provide for a powertrain operating method, comprising:
in response to an actual transmission input shaft speed decreasing to less than a threshold value, classifying a type of transmission degradation and decreasing a negative wheel torque limit toward a value of zero; and adjusting the torque of the motor/generator to provide negative wheel torque less than the negative wheel torque limit based on the type of transmission degradation. The method further comprises adjusting a torque of a motor/generator to provide negative wheel torque less than the negative wheel torque limit. The method further comprises classifying the type of transmission degradation as partial transmission degradation in response to a transmission clutch transferring less than a first threshold amount of torque and more than a second threshold amount of torque. The method further comprises classifying the type of transmission degradation as continuous transmission degradation in response to a transmission clutch transferring less than the second threshold amount of torque. The method further comprises classifying the type of transmission degradation as correctable transmission degradation adjusting a transfer function of a clutch and the clutch transferring a requested amount of regeneration torque.

In some examples, the method further comprises not attempting to engage a transmission clutch in response to classifying the type of transmission degradation as a continuous regeneration transmission issue. The method further comprises not attempting to engage one or more gears that may be activated by applying the transmission clutch. The method includes where the torque of the motor/generator is adjusted to zero.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
in response to an actual transmission input shaft speed decreasing to less than a threshold value, classifying a type of transmission degradation into temporary or continuous, and adjusting a negative wheel torque limit to be less negative by adjusting the limit toward a value of zero; and adjusting a torque of a motor/generator to provide negative wheel torque less negative than the limit based on the type of transmission degradation.

2. The method of claim 1, further comprising adjusting the torque of the motor/generator to provide negative wheel torque less than the negative wheel torque limit.

3. The method of claim 1, further comprising classifying the type of transmission degradation as continuous partial transmission degradation in response to a transmission clutch transferring less than a first threshold amount of torque and more than a second threshold amount of torque.

4. The method of claim 3, further comprising classifying the type of transmission degradation as continuous transmission degradation in response to the transmission clutch transferring less than the second threshold amount of torque.

5. The method of claim 4, further comprising classifying the temporary transmission degradation as correctable transmission degradation and adjusting a transfer function of a clutch and the clutch transferring a requested amount of regeneration torque.

6. The method of claim 1, further comprising not attempting to engage a transmission clutch in response to classifying the type of transmission degradation as continuous.

7. The method of claim 6, further comprising not attempting to engage one or more gears that may be activated by applying the transmission clutch.

8. The method of claim 1, where the torque of the motor/generator is adjusted to zero.

* * * * *